United States Patent [19]

Virnig

[11] 3,850,321
[45] Nov. 26, 1974

[54] WHEEL DOLLY

[76] Inventor: Sep Jacob Virnig, 620 N. 8th St., Medford, Wis. 54451

[22] Filed: Sept. 28, 1973

[21] Appl. No.: 401,889

[52] U.S. Cl................. 214/331, 214/332, 254/10 R
[51] Int. Cl............................................ B60b 29/00
[58] Field of Search........................... 214/330–334, 214/370–378; 187/10, 11, 24, 25; 254/10 R, 133

[56] References Cited
UNITED STATES PATENTS

| | | | |
|---|---|---|---|
| 2,419,314 | 4/1947 | Donald | 214/374 |
| 2,444,992 | 7/1948 | Kittel | 214/331 |
| 2,525,437 | 10/1950 | Winzler et al. | 214/331 |
| 2,640,604 | 6/1953 | Curley | 214/331 |
| 2,881,865 | 4/1959 | Lewis | 187/10 |
| 2,981,374 | 4/1961 | Holsclaw | 187/10 |

*Primary Examiner*—Robert G. Sheridan
*Assistant Examiner*—Lawrence J. Oresky
*Attorney, Agent, or Firm*—Williamson, Bains & Moore

[57] ABSTRACT

A wheel dolly for use in manipulating and transporting heavy vehicle wheels including tandem truck wheels and the like has a rigid generally upright framework having forwardly extending legs which fit on lateral sides of a vehicle wheel, confining it therebetween. A movably mounted carriage is attached to the framework to support a vehicle wheel or wheels and raise or lower the wheel relative to the framework by means of a lifting mechanism attached between carriage and framework. The vehicle wheel is retained by the carriage with its wheel axis generally horizontally oriented and the rim area of the wheel confronts a pair of communicating service apertures in framework and carriage, respectively, permitting an operator to service the rim area of the wheel by working through the apertures of the wheel dolly, eliminating the need to remove the wheel from the dolly to service the outer wheel rim area. Fulcrum means is provided on the framework to permit the operator to pivot the framework rearwardly through approximately 90 degrees to bring the dolly to a generally supine position wherein the wheel axis is generally upright, permitting the operator to service the inner rim area of the wheel from above.

10 Claims, 4 Drawing Figures

PATENTED NOV 26 1974 3,850,321

WHEEL DOLLY

BACKGROUND OF THE INVENTION

Truck tires, whether tandem or single, and tires used on heavy construction equipment are extremely heavy and difficult to handle, often weighing hundreds of pounds and presenting a very real danger to an operator servicing them. Heavy construction vehicles and most commercially utilized trucks require a regular program of preventative maintenance which includes the periodic removal of the vehicle wheels to inspect and repair if necessary the brake linings and seals which are located in the inner rim area of the wheel. In addition, the outer rim area of the wheel must be available for servicing since the wheel bearings are accessible from the outer side of the wheel.

A number of wheel dollies are commercially available and are provided with apparatus which raise and lower the vehicle wheel and which adjust it laterally, the dollies generally being provided with casters to permit the vehicle wheel to be moved about to convenient servicing locations. Presently available wheel dollies retain the vehicle wheel or wheels with the wheel axis in generally horizontal orientation, the outer rim area of the wheel being tightly pressed against the carriage of the wheel dolly and inaccessible for servicing. Typically the carriage and framework of the wheel dolly, along with the lifting apparatus, obstruct the operator's access to the outer side of the wheel rim area making it difficult to service the wheel bearings when the wheel is on the dolly. Accordingly, the present practice has been to service the wheel bearings before removing the wheel from the vehicle with the attendant inconvenience of having to work between adjacent closely parked vehicles where lighting and space are often minimal. It is highly desirable to be able to transport the vehicle wheel to a well lighted convenient working location where these bearings may more easily be serviced.

The commercially available wheel dollies retain the vehicle wheel with the wheel axis horizontal so as to permit servicing of the rear or inner rim area of the wheel. It has been found much easier to service the inner wheel rim area if the wheel axis is generally vertical thus permitting the operator to work on the rim area from above. When the wheel rim can be serviced from above, such servicing is more easily and conveniently accomplished and standard overhead lighting provides adequate illumination to accomplish the task, eliminating the need for auxiliary lighting to overcome the deep shadows created by the wheel rims when in a horizontal wheel axis position.

BRIEF SUMMARY OF THE INVENTION

The invention relates to the field of wheel dollies for trucks, heavy construction equipment, and the like and permits an operator to have safe and convenient access to the outer rim area of the wheel even when the wheel is on the wheel dolly, and is designed to permit the operator to position the vehicle wheel with the wheel axis vertically oriented, thereby allowing servicing of the inner wheel rim area from above. While accomplishing these highly desirable objectives, the apparatus retains all desirable characteristics of prior art wheel dollies.

The wheel dolly invention has a rigid framework which includes a base and pair of generally upright support members extending therefrom with the members spaced laterally apart and interconnected by horizontal beams, the beams and upright members defining the sides of a first servicing aperture in the framework. The base has a pair of legs extending from the upright support members in cantilever fashion, the free ends of the legs having casters thereon to permit the ends of the legs to be positioned on lateral sides of the vehicle wheel to confine the wheel therebetween.

A carriage is carried by the framework and mounted for upward and downward movement relative thereto, the carriage having wheel support means extending forwardly relative to the support members of the framework to receive and support the vehicle wheel thereon with the wheel axis being generally horizontal. The carriage has a pair of laterally spaced upright posts interconnected by carriage beams, the beams and posts defining a second servicing aperture which communicates with the first servicing aperture of the framework to provide unobstructed access to the outer rim area of a vehicle wheel on the dolly.

A second pair of casters is mounted to the base adjacent the bottom and rear thereof to permit rolling of the framework and in addition these casters define a first generally horizontal axis passing through the points of contact between these casters and the floor. Fulcrum means is attached to the framework adjacent the bottom and rear thereof and rearward of the second pair of casters to define a second generally horizontal axis substantially parallel to the first axis and passing through the fulcrum means at its points of contact with the floor. When it is desired to manipulate the dolly supported vehicle wheel so the wheel axis is vertical rather than horizontal, the operator pivots the framework rearwardly about the first axis until the fulcrum means contacts the floor, at which time the framework pivots about the second axis until the wheel axis swings from a generally horizontal to an upright position, at which time the formerly upright framework is now in a supine position substantially parallel to the floor. The fulcrum means may include a pair of runners mounted rearwardly of the upright members to form the legs of a platform retaining the framework a fixed distance from the floor.

A lifting mechanism mounted between the framework and the carriage permits an operator to raise and lower the carriage to a convenient height for reinstallation of the vehicle wheel when servicing has been completed. An apparatus is also provided to permit the carriage to be moved laterally to align the wheel with the vehicle axle. The lifting mechanism is positioned clear of the servicing apertures to assure operation access to the outer rim area of the wheel.

The wheel dolly invention is extremely sturdy, easy to manufacture, long lasting, safe and reliable. Its compact, highly maneuverable design permits it to be used in areas where minimal space is available, as for example in the narrow aisles between closely parked trucks, as is commonly encountered at the servicing facilities of most truck fleets.

These and other advantages will become apparent from the following description and the appended drawings.

MAIN DESCRIPTION

Figures 1, 2:
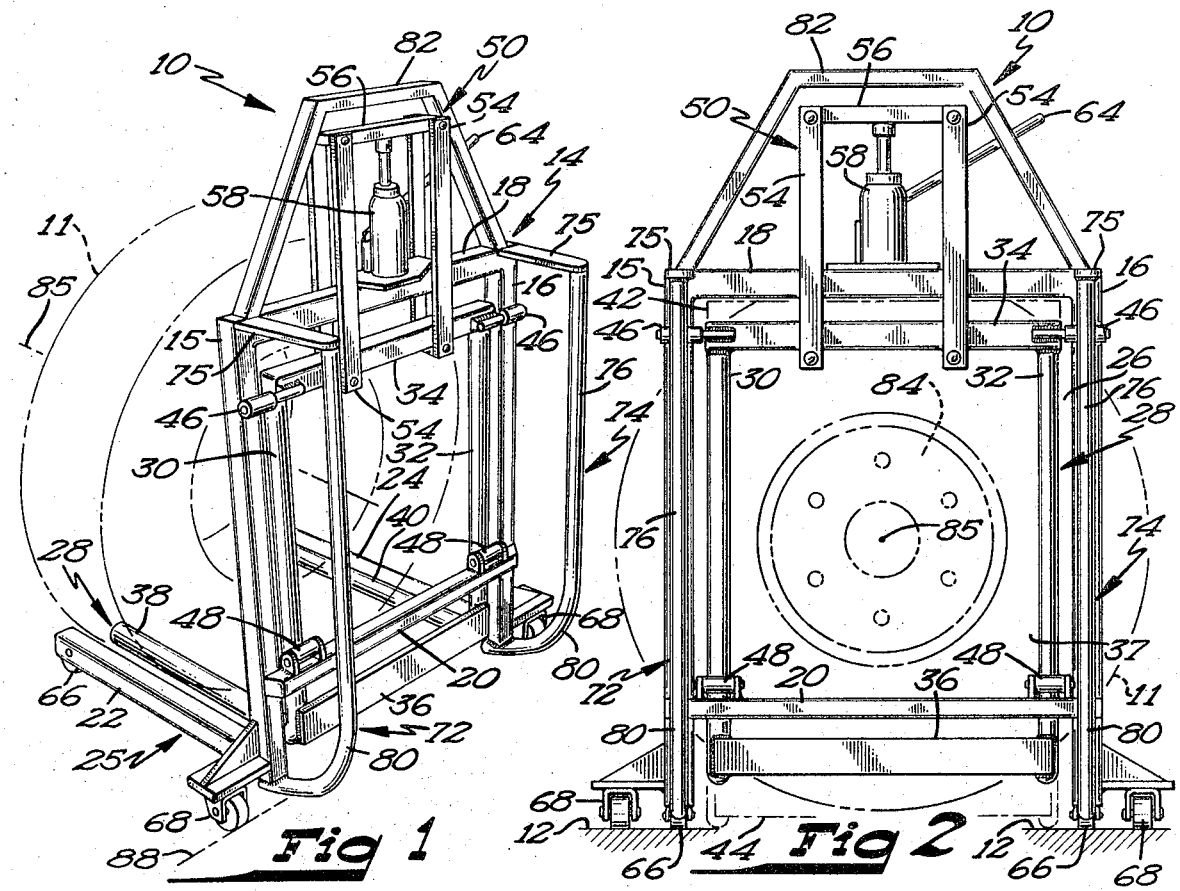
FIG. 1 is a rear perspective view of the wheel dolly with a vehicle wheel in place on the carriage.
FIG. 2 is a rear elevation view of the wheel dolly showing the carriage in alternate elevated and depressed positions.

Referring now to the drawings, a wheel dolly 10 is shown positioned on a floor 12, the dolly being formed of rigid steel or like material.

The dolly has a framework 14 which includes generally upright support members 15 and 16 and interconnecting rigid, generally horizontal upper and lower beams 18 and 20, respectively, which are attached to the upright support members 15 and 16 by welding or other means known to the art. Upright support members 15 and 16 and interconnecting upper and lower frame beams 18 and 20 define the edges of a first servicing aperture through which an operator may easily service the outer rim area 84 of a wheel 11 as will be further described hereafter.

Rigid, generally horizontal legs 22 and 24 are rigidly fixed to the lower ends of the upright support members 15 and 16, respectively, and extend forwardly therefrom. The legs 22 and 24 are spaced laterally from one another sufficiently to permit the legs to be rolled toward a vehicle wheel in place on the vehicle, the leg 22 moving across the path of the wheel on one lateral side thereof and the leg 24 crossing the path of the wheel on the remaining side to confine the wheel therebetween as is shown in the drawings. The intervening space between the legs 22 and 24 aside from the means for actually supporting the wheel, described hereafter, is unobstructed to permit the legs 22 and 24 to move under the truck as the wheel 11 is engaged by the dolly. Accordingly, the legs 22 and 24 comprise a base 25 usable with the wheel dolly, although it should be understood that various other configurations may be substituted for the base and that the precise geometrical configuration of the base is not important so long as it solidly supports the wheel dolly and permits the device to closely approach the wheel on a vehicle. The base 25, upright support members 15 and 16, and interconnecting beams 18 and 20 collectively comprise the framework 14 of the wheel dolly.

A carriage 28 is mounted to the framework 14 for upward and downward movement relative to the framework and has generally upright posts 30 and 32 spaced laterally from one another and interconnected by upper and lower carriage beams 34 and 36, respectively. The posts 30 and 32 and the interconnecting carriage beams 34 and 36 define a second servicing aperture 37 directly confronting the outer rim area 84 of the wheel 11. The carriage also includes a pair of rigid, generally horizontal, forwardly extending rods 38 and 40 spaced laterally from one another and comprising vehicle wheel support means. The rods 38 and 40 are closely adjacent the legs 22 and 24 when the carriage 28 is in depressed position 44, permitting the rods to be positioned on either side of the wheel 11 as the legs 22 and 24 are moved into position on lateral sides of the wheel as shown in FIG. 2.

The upper carriage beam 34 is positioned at the upper ends of the posts 30 and 32 but may be positioned adjacent the upper ends of the posts if desired. It is preferred to place it at the upper ends of the posts in order to maximize the area of the access aperture 37 to permit greater convenience in servicing the outer rim area of the wheel 11. While a horizontal beam 34 is shown, it should be understood that it is not essential that the beam be either horizontal or straight and that curved beams or beams oriented at angles other than the horizontal are usable with the invention. Similarly, the lower carriage beam 36 is positioned adjacent the lower ends of the posts 30 and 32 to provide structural support for the rods 38 and 40 which extend therefrom although the beam 36 need not be at the extreme ends of the posts 30 and 32 as shown, this positioning being preferred to maximize the effective area of the aperture 37.

The posts 30 and 32 are positioned between the upright members 15 and 16, respectively, and move within the framework 14 when the carriage is elevated or depressed as will be further described hereafter. The upper beam 18 of the framework defines the maximum elevation of the carriage 28, the upper carriage beam 34 bearing against the beam 18 when maximum elevation is achieved.

The lower beam 20 of the framework 14 is connected on the rearward sides of the upright members 15 and 16 and is attached to the upright members adjacent their lower ends, the exact positioning being a compromise between providing maximum open area for the first servicing aperture 26 while still providing support to the carriage as it is elevated. Accordingly, the lower beam 20 should be positioned such that the carriage 28 will bear against it while at its most elevated position 42 (FIG. 2).

Accordingly, the second servicing aperture 37 moves within the first servicing aperture 26 in response to upward and downward movement of the carriage 28 and the portions of these apertures which coincide defines the available area through which an operator may service the outer rim area 84 of the wheel 11. The lower frame beam 20 is positioned relative to the lowermost edge of the rim area 84 to avoid obstructing the rim area, the preferred position of the beam 20 being below the rim area.

A pair of rollers is mounted to the carriage 28, a roller 46 being fixed to the upper carriage beam 34 at each end thereof and movably mounting the carriage relative to the framework 14. The rotating portion of each roller 46 bears against the rearward side of the upright support members 15 and 16 providing smoothly rolling movement between carriage and frame when the heavily loaded carriage moves upwardly or downwardly between positions 42 and 44. The rollers 46 also aid in keeping the upright posts 30 and 32 of the carriage 28 in an upright orientation when the carriage is loaded by the vehicle wheel by preventing the upper portion of the carriage 28 from being pulled forwardly by the weight of the wheel 11.

A second set of rollers is mounted on the lower beam 20 of the framework 14, a roller 48 being adjacent each end of the beam 20 and rollingly engaging the upright posts 30 and 32 of the carriage. The rollers 48 aid in promoting smooth rolling movement between carriage and framework, although it should be understood that they need not be mounted on the beam 20 but could alternatively be attached to the upright support members 15 and 16 if desired.

A hydraulic or pneumatic cylinder 58 is mounted on the upper beam 18 and connected to the carriage 28 by means of a linkage 50. The shown cylinder 58 constitutes a lifting mechanism for raising and lowering the carriage 28, although it should be understood that other types of lifting devices known to the art could be substituted and are within the purview of the invention.

The linkage 50 includes generally upright front links 52 which are pivotally mounted between the upper carriage beam 34 and lift bar 56 as well as rear links 54 which are similarly mounted pivotally between beam 34 and bar 56. The four links permit the carriage 28 to be swung laterally a distance of several inches in either direction to permit the wheel 11 supported on the carriage to be aligned with the axle of the vehicle when reinstalling the wheel. Accordingly, the carriage 28 is of a lesser width than the first servicing aperture 26 to permit the carriage being moved sidewardly between the upright support members 15 and 16 for such adjustments. The extreme positions to which the linkage may be laterally swung are indicated in phantom in FIG. 4 as positions 60 and 62. The shown parallelogram-like linkage 50 assures that the plane defined by rods 38 and 40 which support the wheel 11 is always substantially horizontal thereby eliminating the likelihood of the wheel slipping off the rods and falling from the dolly.

When the carriage 28 is to be elevated, the operator pumps actuating handle 64 of the cylinder 58, causing the cylinder to raise the linkage carrying the carriage 28 therewith and lifting the wheel 11 to the desired elevation, the maximum elevation of the carriage being indicated at position 42. A cylinder release valve may be actuated to lower the carriage to the depressed position 44. The carriage 28 includes the forwardly extending rods 38 and 40, generally upright posts 30 and 32, interconnecting carriage beams 34 and 36, the rollers 46, and the linkage 50, although the linkage is not essential to the wheel dolly's effective operation and a non-adjustable linkage could be substituted if desired or the linkage eliminated.

The framework 14 is provided with casters to permit it to be easily and conveniently moved over the floor area even when bearing heavy loads. A first pair of casters 66 is mounted at the free ends of the legs 22 and 24, the casters 66 being nonswiveling to prevent the free ends of the legs 22 and 24 from veering to one side or the other as they are positioned on the lateral sides of a vehicle wheel.

Swiveling casters 68 are mounted to the framework adjacent the bottom and rear thereof and are positioned outboard from the framework 14 to assure that the casters do not interfere with the upward and downward movement of the carriage 28 and to provide a wider wheel base when the framework is pivoted rearwardly as will be further described hereafter. The casters 68 are positioned at outer sides of the upright members 15 and 16 and define a first generally horizontal axis 88 passing therethrough at the points of contact between the casters 68 and the floor 12.

A wheel confining hook 70 is swingably mounted to the upper beam 18 to drop over the upper edge of a wheel or wheels 11 on the dolly, preventing their tipping forwardly or easily escaping the dolly.

Figures 3, 4:
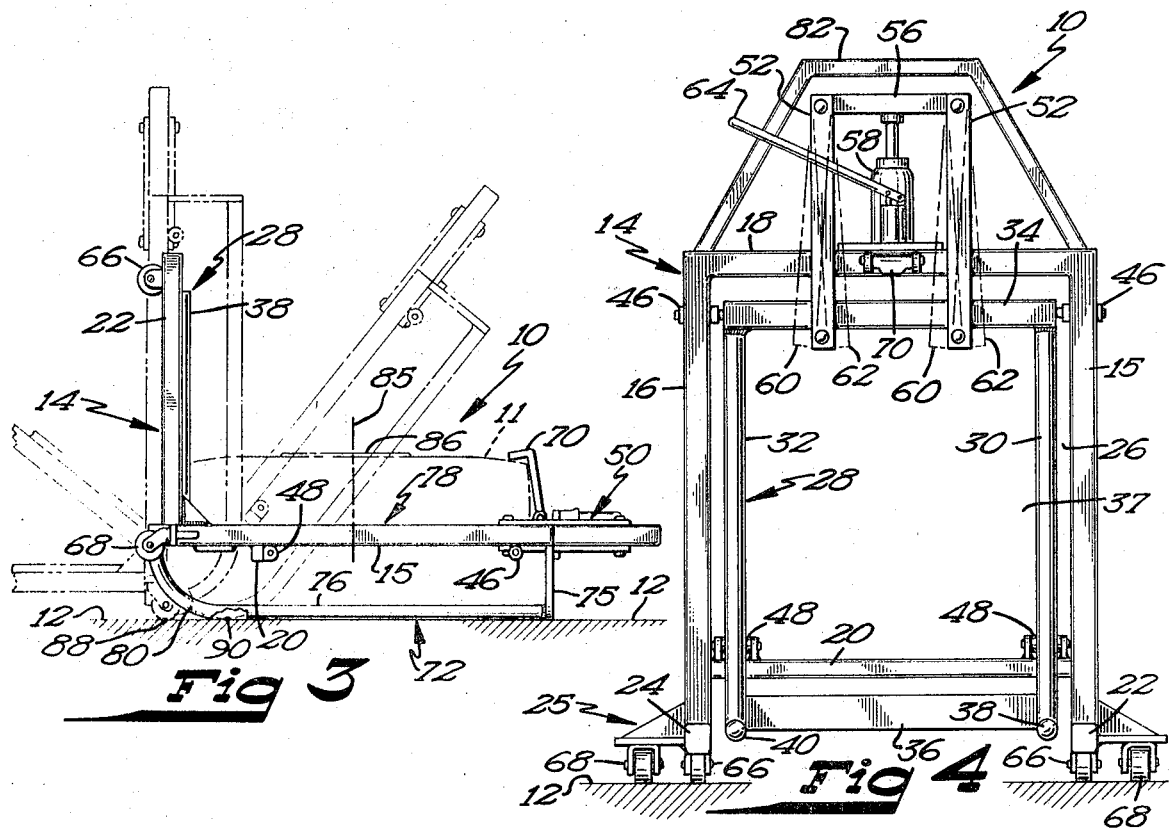
FIG. 3 is a side elevation view of the wheel dolly showing the dolly in upright, intermediate and supine positions.
FIG. 4 is a front elevation view of the wheel dolly showing alternative lateral positions of the carriage.

A pair of runners 72 and 74 are attached to the framework 14 adjacent the bottom and rear thereof, the lowermost portion of the runner being attached at the base and spaced from the floor 12. Each runner includes a bracket or arm 75 extending from the framework to a straight segment 76 of the runner, the segment 76 providing a supporting mount for the frame 14 when the frame is swung to the supine position 78 as will be described hereafter. Each runner has a curved segment 80 extending from the straight segment 76 to the roller end of the upright member 15 or 16. The curved segments 80 of the runners 72 and 74 serve as a fulcrum means when the framework 14 is pivoted rearwardly, the points of contact between the curved segments 80 and the floor 12 defining a generally horizontal axis 90 (seen end on in FIG. 3) extending between the segments 80 as the framework is tipped rearwardly as shown in FIG. 3.

The shown runners 72 and 74 not only provide a convenient mounting for the framework 14 when it is in the supine position 78 and serve as a fulcrum means to greatly facilitate an operator tipping the framework rearwardly to the supine position, but also provide convenient handgrips for manipulating the wheel dolly. It should be understood that while the shown runners are highly desirable, the invention can be pivoted rearwardly even if the runners are greatly shortened or replaced by alternative structure extending rearwardly and downwardly from the upright members 15 and 16 to provide a pivoting location or fulcrum means when the dolly is tipped rearwardly, and such structure as an alternative fulcrum means is within the purview of the invention. It should further be understood that the straight segments 76 of the runners are not essential to the operation of the invention and, alternatively, rearwardly projecting arms mounted on the upright members 15 and 16, such as brackets or arms 75, could be used to mount the framework at a position spaced from the ground when in supine position.

A generally U-shaped handle 82 is fixed to the upper extremity of the framework 14, extending upwardly therefrom to provide a convenient grasping location for an operator in manipulating the wheel dolly. The handle 82 also provides a helpful guard rail about the linkage 50 and cylinder 58. It should be understood that alternative handle structures may be substituted for the handle 82 and are within the purview of the invention.

In operation, an operator maneuvers the wheel dolly 10 into position confronting a vehicle wheel 11 on the truck or other vehicle, positioning the leg 22 and bar 38 adjacent one side of the wheel 11 and the leg 24 and bar 40 adjacent the remaining side, the bars 38 and 40 being generally parallel to the wheel axis 85, and then pushes the wheel dolly toward the wheel until the upright posts 30 and 32 of carriage 28 are substantially adjacent the outer rim area 84 of the wheel 11. Substantially the entire outer rim area 84 will now be accessible to the operator through the communicating apertures 26 and 37. Since the wheel 11 will have been jacked off the floor 12, the operator next moves the operating lever 64 of the cylinder 58 to raise the carriage 28 to a height where the legs 38 and 40 fully support the wheel 11. Any remaining studs or nuts holding the wheel 11 to the truck axle are now removed and the dolly 10 is pulled rearwardly from the truck, carrying the vehicle wheel 11 therewith. The operator lowers the wheel retaining hook 70 over the top of the vehicle wheel to eliminate any likelihood of it escaping the wheel dolly and proceeds with servicing of the wheel. If he wishes to move the dolly to a convenient working area where lighting conditions and space are improved, he merely rolls the dolly on its casters 66 and 68 to such area.

The apertures 26 and 27 which now communicate to provide a large open unobstructed servicing area for the operator, permit the operator to have the complete and convenient access to the outer rim area 84 of the wheel 11 which is necessary to inspect the wheel bearings. After servicing the bearings, the operator grips the wheel dolly by handle 82 and exerts a rearwardly directed force to pivot it backwardly and to the supine position 78. As the dolly tips rearwardly, it pivots about the horizontal axis 88 defined by the points of contact between casters 68 and the floor 12, such pivoting continuing until the curved segments 80 comprising the fulcrum means contact the floor 12, at which time the dolly begins pivoting about a second horizontal axis defined by the points of contact between the curved segment 80 and the floor 12, the position of this second axis moving along the segments 80 as the tipping continues until the wheel dolly is in a supine position 78 and supported on the straight segments 76 of the runners 72 and 74. In the supine position 78, the axis 85 is no longer in the original horizontal position and has shifted to a generally upright orientation permitting the operator to service the inner rim area 86 of the wheel 11 from above. In the supine position, the operator checks the brake linings of the wheel and the condition of the seal as well as any other maintenance that might be necessary.

When inspection and maintenance have been completed, the operator grips the handle 82 and raises the wheel dolly to its original upright orientation and rolls it back to the axle area of the vehicle to reinstall the wheel. If for any reason, the wheel must be raised or lowered to accommodate the extending axle, the operator uses the lifting mechanism 58 to raise and lower the carriage. As the carriage moves up or down relative to the framework, the rollers 46 and 48 assure smooth rolling movement of the carriage relative to the frame without any danger of carriage hangup.

If, after bringing the carriage 28 to the proper elevation for reinstallation of the wheel 11 on the axle, it is found that the axle is displaced to left or right of the opening in the wheel rim, the operator may manually urge the carriage in a left or right direction between the lateral positions 60 and 62 to align the wheel on the axle, no movement of the framework 14 of the wheel dolly relative to the floor 12 being necessary. Finally, the operator may reinstall the studs or nuts on the outer rim area 84 by working through the communicating service apertures 26 and 37 thereby eliminating the need to remove the wheel dolly until servicing has been completed. Since the wheel dolly is interposed between the operator and the wheel, there is no danger of the wheel 11 falling on the operator if it slips off the axle. Since such vehicle wheels are extremely heavy, often weighing hundreds of pounds, this is an important safety consideration. Finally, when the wheel has been reattached to the axle, the operator opens the release valve on the cylinder 58 permitting the carriage 28 to drop to its depressed position 44 and then withdraws the carriage from the wheel area, substantially completing the servicing operation.

Accordingly, it is seen that the present invention provides a substantially improved wheel dolly utilizing the advantages of known equipment and permitting greatly improved access to the outer rim area of the wheel while the wheel is on the dolly and permitting the operator to pivot the wheel dolly to a supine position in which the operator may easily and safely service the inner rim area of the wheel from above.

While the preferred embodiments of the present invention have been described, it should be understood that various changes, adaptations and modifications may be made therein without departing from the spirit of the invention and the scope of the appended claims.

What is claimed is:

1. A wheel dolly for use on a floor-like surface for manipulating and transporting a vehicle wheel during servicing, comprising:

a rigid framework including a base and a pair of generally upright support members, said base including a pair of legs spaced laterally apart, one of said legs extending forwardly from the lower end of each said upright support member so as to be positioned on each lateral side of the vehicle wheel to confine the wheel therebetween;

a carriage carried by said framework, mounted thereto for upward and downward movement relative thereto, and including wheel support means extending forwardly relative to said support members to receive and support the vehicle wheel thereon with the wheel axis being generally horizontal;

a lifting mechanism attached to said framework and to said carriage for raising and lowering said carriage relative to said framework;

a first pair of casters, said casters being mounted adjacent the free end of each said leg to permit rolling movement of said legs relative to the floor;

a second pair of casters, mounted to said framework adjacent the bottom and rear thereof to permit said framework to be rolled on the floor and said second pair of casters defining a first generally horizontal axis passing therethrough at the point of contact between casters and floor; and fulcrum means attached to said framework adjacent the bottom and rear thereof and spaced from the floor, defining a second generally horizontal axis through said fulcrum means, substantially parallel to said first axis and rearward thereof so an operator may swing said framework to a supine position by applying rearwardly directed force to said framework adjacent its top to pivot said framework rearwardly about said first axis until said fulcrum means contacts the floor, said framework then pivoting about said second axis until the axis of the wheel supported on said framework swings from the generally horizontal orientation to an upright orientation to facilitate convenient servicing of inner and outer rim areas of the wheel by the operator further, said carriage being pivotally mounted to said lifting mechanism for bodily shifting of said carriage in a plane passing through said upright support members.

2. The wheel dolly of claim 1 and further including a pair of arms fixed to said framework adjacent the upper ends of said supporting members and extending rearwardly to support said framework at a predetermined distance from the floor when pivoted to the supine position.

3. The wheel dolly of claim 1 wherein said fulcrum means includes a pair of runners fixed to said framework and positioned rearwardly of said upright members, each runner including a straight floor engaging section for supporting said framework when in supine position and a curved section extending between the straight segment and the lower end of its said upright member, permitting said framework to be pivoted on said curved sections to supine position.

4. A wheel dolly for manipulating a vehicle wheel and servicing the rim area thereof while the wheel is on the dolly comprising:
   a rigid framework including a base, a pair of generally upright support members with their lower ends fixed to said base and said members spaced laterally from one another adjacent opposed edges of the rim of the wheel;
   said framework further including an upper frame beam rigidly interconnecting said support members adjacent their upper ends, and a lower frame beam rigidly interconnecting said upright support members adjacent the lower most edge of the rim area of a vehicle wheel retained by said wheel support means;
   a carriage carried by said framework and mounted for upward and downward movement relative to said framework and including vehicle wheel support means;
   a lifting mechanism attached to said framework and said carriage for raising and lowering said carriage relative to said framework;
   said pair of support members and upper and lower beams of said framework defining the sides of a first servicing aperture confronting the rim area of the vehicle wheel when the wheel is retained by said wheel support means of said carriage; and said carriage further including a pair of generally upright posts and spaced laterally from one another adjacent opposed lateral edges of the rim area, and upper and lower carriage beams interconnecting said posts adjacent the upper and lower ends of said posts, respectively, said posts and carriage beams defining the sides of a second servicing aperture adjacent to and communicating with said first service aperture to permit an operator to service the rim area of the wheel through said first and second servicing apertures further, said carriage being pivotally mounted to said lifting mechanism for bodily shifting of said carriage in a plane passing through said upright support members.

5. The wheel dolly of claim 4 and further including a rigid handle extending upwardly from said framework and fixed thereto adjacent said upper frame beam.

6. The wheel dolly of claim 4 wherein said carriage further includes a linkage for laterally moving said carriage relative to said framework.

7. The wheel dolly of claim 6 wherein said lifting mechanism is mounted upon said upper frame beam clear of said first and second apertures and connected to said linkage to raise and lower said carriage.

8. The wheel dolly of claim 4 wherein said carriage includes rollers extending laterally therefrom adjacent said upper carriage beam and rollingly engaging the rearmost side of said upright members of said frame.

9. The wheel dolly of claim 4 wherein roller means are mounted to said framework to rollingly engage said upright posts of said carriage to promote smooth rolling movement between said carriage and said framework.

10. The wheel dolly of claim 4 wherein said carriage posts are parallel to said upright members and positioned between said upright members.

* * * * *